(12) United States Patent
Mohr et al.

(10) Patent No.: US 6,371,999 B1
(45) Date of Patent: Apr. 16, 2002

(54) POLYISOBUTYLAMINOALCOHOLS AND FUELS FOR INTERNAL COMBUSTION ENGINES CONTAINING THESE PRODUCTS

(75) Inventors: Juergen Mohr, Gruenstadt; Knut Oppenlaender, Ludwigshafen; Charalampos Gousetis, Ludwigshafen; Ralf Kaestner, Ludwigshafen; Norbert Rieber, Mannheim; Martin Fischer, Ludwigshafen; Juergen Thomas, Fussgoenheim, all of (DE)

(73) Assignee: BASF Aktiengesellschaft, Ludwigshafen (DE)

(*) Notice: Subject to any disclaimer, the term of this patent is extended or adjusted under 35 U.S.C. 154(b) by 1620 days.

(21) Appl. No.: 08/701,188

(22) Filed: Aug. 21, 1996

Related U.S. Application Data

(63) Continuation of application No. 08/400,286, filed on Mar. 3, 1995, now abandoned, which is a continuation of application No. 08/199,358, filed on Feb. 18, 1994, now abandoned, which is a continuation of application No. 07/761,129, filed on Sep. 17, 1991, now abandoned.

(30) Foreign Application Priority Data

Sep. 24, 1990 (DE) .......................................... 40 30 164

(51) Int. Cl.$^7$ ................................ C10L 1/18; C10L 1/22
(52) U.S. Cl. ............................ 44/412; 44/432; 44/433; 44/434
(58) Field of Search .......................... 44/432, 433, 434, 44/412

(56) References Cited

U.S. PATENT DOCUMENTS

| | | | | |
|---|---|---|---|---|
| 2,856,363 A | * | 10/1958 | Brennan ...................... 252/33.6 |
| 3,088,815 A | | 5/1963 | Haney et al. ................... 44/71 |
| 3,116,129 A | | 12/1963 | Udelhofen ...................... 44/75 |
| 3,183,070 A | | 5/1965 | Udelhofen ...................... 44/71 |
| 3,426,062 A | | 2/1969 | Rosenwald ................. 260/468 |
| 3,756,793 A | | 9/1973 | Robinson | |
| 3,764,281 A | | 10/1973 | Biasotti ......................... 44/62 |
| 3,794,586 A | * | 2/1974 | Kimmura et al. ...... 252/51.5 R |
| 3,898,056 A | | 8/1975 | Honnen ......................... 44/58 |
| 3,931,024 A | | 1/1976 | Hu .......................... 252/51.5 R |
| 3,960,515 A | | 6/1976 | Honnen ......................... 44/58 |
| 4,055,402 A | * | 10/1977 | Battersby et al. .............. 44/433 |
| 4,152,499 A | | 5/1979 | Boerzel et al. .............. 526/52.4 |
| 4,410,335 A | * | 10/1983 | Childs .......................... 44/433 |
| 4,832,702 A | | 5/1989 | Kummer et al. | |
| 4,834,776 A | | 5/1989 | Axelrod et al. ................. 44/63 |

FOREIGN PATENT DOCUMENTS

| | | |
|---|---|---|
| CA | 1003442 | 11/1977 |
| EP | 0117108 | 8/1984 |

\* cited by examiner

*Primary Examiner*—Margaret Medley
(74) *Attorney, Agent, or Firm*—Keil & Weinkauf

(57) ABSTRACT

Fuels for internal combustion engines or lubricants contain small amounts of polyisobutylaminoalcohols of the formulae Ia and Ib

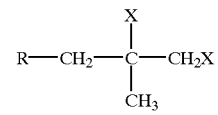

Ia

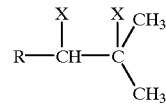

Ib where R is polyisobutyl having a number average molecular weight of 500 to 5,000 and in each of the two formulae one of the radicals X is OH and the other is the group

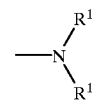

where the radicals $R^1$ may be identical or different and are each hydrogen, alkyl, hydroxyalkyl or aminoalkyl which may be substituted by further hydroxyl- or amino-carrying alkyl radicals, or the two radicals $R^1$ may form a nonaromatic ring.

5 Claims, No Drawings

POLYISOBUTYLAMINOALCOHOLS AND FUELS FOR INTERNAL COMBUSTION ENGINES CONTAINING THESE PRODUCTS

This application is a continuation of application Ser. No. 08/400,286, filed on Mar. 3, 1995, now abandoned which is a continuation application of Ser. No. 08/199,358, filed on Feb. 18, 1994, now abandoned which is a continuation application of Ser. No. 07/761,129, filed on Sep. 17, 1991 now abandoned.

The present invention relates to polyisobutylaminoalcohols, a process for their preparation and fuels for internal combustion engines and lubricants containing small amounts of the polyisobutylaminoalcohols.

The carburetor and fuel intake system of gasoline engines as well as injection systems for metering fuel into gasoline and diesel engines increasingly become contaminated by dust particles from the air, uncombusted hydrocarbon residues from the combustion space and the crankcase vent gases passed into the carburettor.

The residues shift the air/fuel ratio in the idling state and in the lower part-load range, so that the mixture becomes fatter, the combustion less complete and in turn the amounts of uncombusted or partially combusted hydrocarbons in the exhaust gas become larger and the gasoline consumption increases.

It is known that these disadvantages can be avoided by using fuel additives for keeping the valves and the carburetor or injection systems clean (cf. for example M. Rossenbeck in Katalysatoren, Tenside, Mineral-osladditive, Editors J. Falbe and U. Hasserodt, page 223 et seq., G. Thieme Verlag, Stuttgart 1978).

A distinction is made today between two generations, depending on the mode of action and on the preferred point of action of such detergent additives.

The first generation of additives was merely able to prevent the formation of deposits in the fuel intake system but was not capable of removing existing deposits, whereas the additives of the second generation were able to do both (keep-clean and clean-up effects) and, owing to their excellent heat stability, were able to do so in particular in zones at higher temperatures, ie. in the fuel intake valves.

The molecular structural principle of motor fuel detergents can be described in general as the bonding of polar structures to, in general, relatively high molecular weight, nonpolar or lipophilic radicals.

Members of the second generation of additives are often products based on polyisobutenes in the nonpolar moiety. Among these, additives of the polyisobutylamine type are particularly noteworthy. Polyisobutylamines are obtained starting from polyisobutenes, essentially by two processes. The first takes place via chlorination of the polymeric parent structure followed by nucleophilic substitution by amino or, preferably, ammonia. The disadvantage of this process is the use of chlorine and the occurrence of chlorine- or chloride-containing products, which are no longer desirable and as far as possible are avoided (German Laid-Open Application DOS 2,129,461 and DOS 2,245,918).

In the second process, a reactive polyisobutene is first carbonylated in an oxo process and then hydrogenated under aminating conditions in the presence of ammonia (German Laid-Open Application DOS 3,611,230).

Although these motor fuel detergents have a good dispersant effect on the existing deposits, it is an object of the present invention to propose additives which have a particularly good dispersant effect.

We have found that this object is achieved by fuels for internal combustion engines and lubricants containing small amounts of compounds of the formulae Ia and Ib

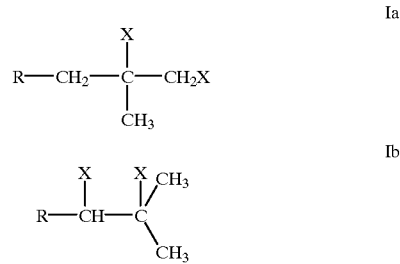

where R is polyisobutyl having a number average molecular weight of 500 to 5,000 and in each of the two formulae one of the radicals X is OH and the other is the group

where the radicals $R^1$ may be identical or different and are each hydrogen, alkyl, hydroxyalkyl or aminoalkyl which may be substituted by further hydroxyl- or amino-carrying alkyl radicals, or the two radicals $R^1$ may form a nonaromatic ring.

Preferred compounds of this type are those in which one radical $R^1$ is hydrogen and the other is a polyamine radical, in particular an ethyleneamino-ethyleneamine radical.

The polyisobutylaminoalcohols according to the invention are added to the motor fuels in amounts of from 50 to 5,000 ppm, preferably from 100 to 2,000 ppm and to lubricating oils in amounts of from 0.5 to 10, preferably from 1 to 5, % by weight, based on the lubricating oil.

The novel additives are preferably used together with conventional polyisobutylamines of the formula

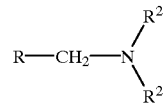

where R has the abovementioned meaning and $R^2$ is hydrogen, alkyl or aminoalkyl which may be substituted by further amino-carrying alkyl radicals, in order to achieve both a very good detergent effect and a very good dispersant effect.

The polyisobutylaminoalcohols according to the invention are advantageously obtained by epoxidation of the corresponding polyisobutenes followed by nucleophilic cleavage of the epoxide with ammonia or an amine.

For this purpose, a reactive polyisobutene is first converted into the corresponding epoxide by means of a known epoxidation reagent and with or without a catalyst (peracetic acid, m-chlorobenzoic acid, hydroperoxides and similar reagents) (cf. for example G. Dittius in Houben-Weyl, Vol. 6/3, 4th edition, page 385 et seq., G. Thieme Verlag, Stuttgart 1965, or D. Swern, Org. React. Vol. VII, 378 et seq. (1953)).

The polyisobutenes used have a mean molecular weight of from 500 to 5,000, preferably from 800 to 1,500. They are obtained by cationic polymerization of isobutene by a known process. After termination of the polymer chain a double bond remaining in the monomer last incorporated (cf. for example German Laid-Open Application DOS 2,702,604 and EP-A 0 145 235).

Is epoxidized by a conventional method. The epoxidation of a polyisobutene for example by means of m-chloroperbenzoic acid, is described by J. P. Kennedy et al., J. Polym. Sci.: Polym. Chem. Ed. 20 (1982), 2809–2817.

Very high yields of epoxide are also obtained by reacting the olefin with a hydroperoxide, eg. tert-butyl hydroperoxide, in the presence of a transition metal catalyst (a molybdenum or tungsten salt or complex) in a solvent which is inert under the reaction conditions or in the absence of a solvent.

The epoxides obtained by the abovementioned processes can be reacted with ammonia, amines, polyamines, such as diethylenetriamine or triethylenetetramine, polyimines, alkanolamines, such as ethanolamine, diethanolamine or aminoethylethanolamine, or cyclic amine derivatives, by either mixing the reactants in the absence of a solvent or dissolving them in a solvent which is inert under the reaction conditions, for example in an aliphatic or aromatic hydrocarbon or an ether, and reacting them with one another at elevated temperatures, either with refluxing of the particular solvent or in a pressure vessel.

The presence of, in general, stoichiometric amounts of water, which serves as the catalyst, is frequently necessary for very rapid and complete conversion (cf. for example S. P. McManus et al., Synth. Commun. 1973, 177).

Rapid and complete conversions are also achieved by the additional use of acidic or Lewis acid catalysts (p-toluenesulfonic acid, carboxylic acids, boron trifluoride etherate, titanates or stannates).

Starting from the corresponding epoxides, this method gives aminoalcohol derivatives which are similar to the starting compounds in their physical properties. In addition to the activity as detergents and dispersants in the fuel intake system, the reaction products with higher amines, which products are to be added according to the invention, also have dispersant properties in the engine oil whereas the known polyisobutylamines are at best neutral to engine sludge.

Testing of the products as motor fuel additives, particularly for their suitability as valve and carburetor cleaners, is performed by means of engine tests carried out on test stands using a 1.2 l Opel Kadett engine according to CEC-F-02-T-79.

To evaluate the dispersant effect of additives, it is possible to use a spot test as described, for example, by A. Schilling in Les Huiles pour Moteurs et le Graissage des Moteurs, Vol. 1, 1962, page 89 et seq., in somewhat modified form.

EXAMPLE 1
Preparation of the Polyisobutene Epoxides
a) Epoxidation with Peracetic Acid 900 g of a reactive polyisobutene having a molecular weight $M_n$ of 950 (prepared according to German Laid-Open Application DOS 2,702,604) are dissolved in 2,000 mol of toluene. 83 g of peracetic acid in the form of a 10% strength solution in glacial acetic acid are added dropwise to this solution in the course of one hour at −40° C. Stirring is then continued for about a further hour at this temperature.

The mixture is cooled, after which the toluene phase is separated off, washed twice with 300 ml of water and dried. Peroxide is then no longer detectable in the solution by titration.

The degree of epoxidation is about 70% according to epoxide titration (Analyt. Chem. 36 (1964), 667).

b) Epoxidation with Tert-butyl Hydroperoxide

A solution of 100 g of a reactive polyisobutene having a molecular weight $M_n$ of 950 (prepared according to German Laid-Open Application DOS 2,702,604), 81 g of 1:1 tert-butyl hydroperoxide/tert-butanol and 0.7 g of molybdenum ethylhexanoate in cyclohexanol (Mo content 6.6%) is heated for one hour at 80° C. and for a further 2 hours at 90° C. The mixture is cooled, after which the two phases are separated from one another and the polyisobutene phase is, if necessary, washed with water and dilute sodium bicarbonate solution.

Volatile constituents and low boilers are then removed at 80° C. under reduced pressure from a water pump.

102.6 g of an oily residue remain, said residue containing more than 95% of epoxide according to volumetric titration (Analyt. Chem. 36 (1964), 667). The formation of the epoxide can be monitored by $^1$H- and $^{13}$C-NMR spectroscopy.

EXAMPLE 2
Reaction of the epoxide with Amines, eg. Diethylenetriamine 0.5 mol of diethylenetriamine in 300 ml of xylene is initially taken and refluxed. A solution of 0.1 mol of the epoxide according to Example 1 a) in 300 ml of xylene is then slowly added dropwise. The mixture is refluxed for about 10 hours, after which the epoxide value of the mixture is found to have decreased to zero. After cooling, the solution is washed with 300 ml of water and dried.

The solvent and excess amine are distilled off, initially at atmospheric pressure and subsequently at reduced pressure, and the product is isolated as a ayellow, very viscous oil.

EXAMPLE 3

Results of engine tests, testing as valve cleaner

|  | Deposit [mg]* Valve No. | | | |
| --- | --- | --- | --- | --- |
|  | 1 | 2 | 3 | 4 |
| Polyisobutylamine according to German Laid-Open Application DOS 3,611,230 | 15 | 0 | 0 | 10 |
| Reaction product from Example 2 | 22 | 0 | 3 | 8 |

*According to CEC-F-02-T-79

To evaluate the dispersant effect, a spot test, as described, for example, by A. Schilling in Les Huiles pour Moteurs et le Graissage des Moteurs, Vol. 1, 1962, page 89 et seq., in slightly modified form, is used as a preliminary test.

For this purpose, a 2.5% strength solution of the amine/epoxide adduct obtained according to Example 2 in an unblended base oil is prepared and carbon black (for example MT carbon black Thermax, Lehmann & Voss & Co., Hamburg) is then dispersed therein at about 50° C. while stirring in the course of one hour. This dispersion is developed on a blotting paper (filter paper) in the same way as a chromatogram for about 20 hours.

The areas of pure mobile phase (oil) and dispersed carbon black are compared:

| Basic value | from 1 to 2% of the total area |
| --- | --- |
| Polyisobutylamine for comparison | 11% of the total area |
| Reaction product according to Example 2 | 32% of the total area |

This shows that the reaction product to be used according to the invention has for the same detergent effect a substantially better dispersant effect than the corresponding poluisobutylamine according to the comparison in the above table.

We claim:

1. A fuel for internal combustion engines containing detergent-effective and dispersant-effective amounts of compounds of the formulae Ia and Ib

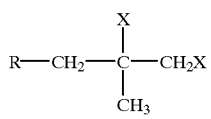

Ia

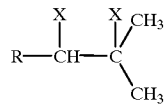

Ib where R is polyisobutyl having a number average molecular weight of 500 to 5,000 and in each of the two formulae one of the radicals X is OH and the other is the group

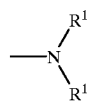

where the radicals $R^1$ may be identical or different and are each hydrogen, alkyl, hydroxyalkyl or aminoalkyl which may be substituted by further hydroxyl- or amino-carrying alkyl radicals, or the two radicals $R^1$ may form a nonaromatic ring.

2. The fuel of claim 1, wherein one radical $R^1$ is hydrogen and the other is an ethyleneaminoethyleneamine radical and wherein the number average molecular weight of polyisobutyl is from 800 to 1500.

3. The fuel of claim 1, which contains form 50 to 5,000 ppm of the compounds of the Ia and Ib.

4. A fuel for internal combustion engines containing detergent-effective and dispersant-effective amounts of compounds of the formula Ia

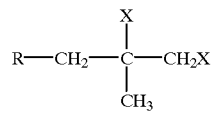

Ia where R is polyisobutyl having a number average molecular weight of 800 to 1,500 and one of the radicals X is OH and the other is the group

where the radicals $R^1$ may be identical or different and are each hydrogen, alkyl, hydroxyalkyl or aminoalkyl which may be substituted by further hydroxyl- or amino-carrying alkyl radicals, or the two radicals $R^1$ may form a nonaromatic ring.

5. A fuel for internal combustion engines containing detergent-effective and dispersant-effective amounts of compounds of the formula Ib

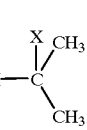

Ib where R is polyisobutyl having a number average molecular weight of 800 to 1,500 and one of the radicals X is OH and the other is the group

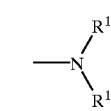

where the radicals $R^1$ may be identical or different and are each hydrogen, alkyl, hydroxyalkyl or aminoalkyl which may be substituted by further hydroxyl- or amino-carrying alkyl radicals, or the two radicals $R^1$ may form a nonaromatic ring.

* * * * *